(12) United States Patent
Ishihara et al.

(10) Patent No.: US 8,408,795 B2
(45) Date of Patent: Apr. 2, 2013

(54) BALL-SPLINE WITH ROTARY MECHANISM

(75) Inventors: Toyohisa Ishihara, Gifu-ken (JP);
Shinji Kanoh, Gifu-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 38 days.

(21) Appl. No.: 13/220,294

(22) Filed: Aug. 29, 2011

(65) Prior Publication Data

US 2012/0076447 A1    Mar. 29, 2012

(30) Foreign Application Priority Data

Sep. 29, 2010    (JP) ................................. 2010-218592

(51) Int. Cl.
*F16C 29/06*    (2006.01)
(52) U.S. Cl. .......................................................... 384/43
(58) Field of Classification Search .................... 384/13, 384/43, 44
See application file for complete search history.

(56) References Cited

U.S. PATENT DOCUMENTS

| | | | | |
|---|---|---|---|---|
| 4,936,692 A | * | 6/1990 | Tanaka | 384/43 |
| 5,476,325 A | * | 12/1995 | Ishihara | 384/43 |
| 5,695,288 A | * | 12/1997 | Sugihara et al. | 384/13 |
| 7,637,662 B2 | * | 12/2009 | Kato et al. | 384/43 |
| 2006/0023980 A1 | * | 2/2006 | Kato et al. | 384/43 |
| 2007/0223846 A1 | * | 9/2007 | Fujii | 384/43 |

FOREIGN PATENT DOCUMENTS

JP    2004-128485 A    4/2004

* cited by examiner

*Primary Examiner* — Phillip A Johnson
(74) *Attorney, Agent, or Firm* — Browdy and Neimark, PLLC

(57) ABSTRACT

A ball-spline with rotary mechanism is provided which is as small as possible in size, able to perform high-precision works on a small scale and also weighs less than ever, helping the downsizing of the component-placement systems. The ball-spline has a spline shaft, a slider movable along the spline shaft through balls, and bearings installed on the opposite ends of the slider for rotation relative to a machine bed. The holder has a pair of projections which extend through slots in the spacer parts and slots in the end-cap major body to fit into slots in a carriage. Fastening screws fit into threaded holes in the projections to fasten the holder to the opposite ends of the slider.

7 Claims, 5 Drawing Sheets

BALL-SPLINE WITH ROTARY MECHANISM

FIELD OF THE INVENTION

The present invention relates to a ball-spline with rotary mechanism, which is better for a component-placement head to be used in an upright or vertical posture in a diversity of manufacturing machines including, for example, semiconductor fabricating equipment, assembling machines and so on.

BACKGROUND OF THE INVENTION

Recently advanced electronics are increasingly required to be more miniaturized or downsized with high performance. Correspondingly, the ball-splines with rotary mechanism used as the component-placement heads in diverse industrial fields including semiconductor fabricating equipment, assembling machines and so are also challenged to help the downsizing of the electronics with high performance.

In Japanese Laid-Open Patent Application No. 2004-128 485, there is described an example of the ball-spline with rotary mechanism, which is used for the component-placement head. With the prior ball-spline with rotary mechanism, a pair of first and second sliders is installed on a spline shaft, spaced away at a preselected interval from each other. The spline shaft is allowed to travel up and down relatively to the sliders by virtue of rolling elements or balls. With the prior ball-spline with rotary mechanism, moreover, there are provided bearing mountings one of which is installed above the first slider and another mounting is below the second slider. Cylindrical members are provided one of which fits over the first slider while another embraces around the second slider. An intermediate cylindrical member is provided which extends across the first and second sliders to fit over both the sliders and connect integrally the sliders with each other. Thus, the cylindrical members are integrally supported by means of the bearings for rotation around the lengthwise center of the spline shaft with respect to a head frame.

With the ball-spline with rotary mechanism built in the component-placement head, the cylindrical members have the bearing mountings near the sliders, respectively, which fit snugly into the cylindrical members. The bearings that have fit over bearing mountings are slightly larger in outside diameter than the cylindrical members and therefore the bearings around outer circular surfaces of their outer rings closely fit into the head frame to bear the ball-spline for rotation with respect to the head frame. Thus, the prior ball-spline with rotary mechanism constructed as stated earlier couldn't get out of becoming bigger in the outermost diameter by as twice as the radial thickness of the cylinder member that has fit over the relevant slider. This means the prior art is inevitably disadvantageous to downsizing the ball-spline with rotary mechanism. Moreover, the cylindrical members have to be worked or finely finished over the inside circular surface thereof so as to closely fit over the outside circular surface of the relevant slider. This also means the prior construction as stated earlier involves additional manufacturing steps for ensuring high precision in assemblage.

Referring to FIG. 8, there is shown a conventional ball-spline which is mainly composed of a spline shaft 51 of right circular cylinder having raceway grooves 56 lying diametrically opposed to each other on a circular surface of the cylinder to extend lengthwise of the cylinder, and a slider 52 that fits over or conforms to the spline shaft 51 so as to travel up and down along the spline shaft 51 in a sliding manner by virtue of rolling elements or ball 57. The slider 52 is composed of a carriage 53 of a cylindrical shell that fits over the spline shaft 51, end caps 54 secured on lengthwise opposite ends of the carriage 53, one to each end, end seals 55 arranged on outward ends of the end caps 54 to close an annular clearance between the spline shaft and the slider 52, and a plurality of rolling elements allowed to roll in a recirculating manner through looped circuits. The carriage 53 has raceway grooves 61 cut in an inside circular surface thereof in opposition to the raceway grooves 56 on the spline shaft 51 to define load-carrying raceways 62 between them, and return passages 58 extending in parallel with the load-carrying raceways 62. The end caps have turnaround passages to connect the load-carrying raceways 62 to the return passages 58 to provide the looped circuits made up of the load-carrying raceways 62, return passages 58 and a pair of the turnaround passages. The end caps 54 and end seals 55 are secured on the carriage 53 by means of fastening screws 59. The spline shaft 51 comes into mating with the slider 52 through the rolling elements 57 to provide nearly frictionless linear sliding motion relatively to each other while allowing transmitting torque between them simultaneously. The slider 52 on a circular outside thereof has a key slot 60 into which a key fits to keep the slider 52 against rotation relative to a machine housing the slider 52 therein.

As the advanced electronics become more downsized even with high performance, the ball-spline with rotary mechanism for the component-placement heads in diverse industrial fields including semiconductor fabricating equipment, assembling machines and so on are needed to be downsized with high performance to help the miniaturization or downsizing of the component-placement systems that the ball-spline with rotary mechanism is built in.

SUMMARY OF THE INVENTION

The present invention has for its primary object to overcome the major challenge as stated earlier, and to provide a ball-spline with rotary mechanism that is as small as possible in size and also weighs less than ever, helping the downsizing of the component-placement systems that the ball-spline with rotary mechanism is built in.

The present invention is concerned with a ball-spline with rotary mechanism, comprising; an elongated spline shaft circular in transverse section having raceway grooves extending lengthwise of the spline shaft on a circular surface of the shaft at locations angularly opposite to each other, a slider fitting over or conforming to the spline shaft to move up and down along the spline shaft in a sliding manner by virtue of rolling elements of balls, holders lying on lengthwise opposite ends of the slider, and rolling-contact bearings installed to keep the holders for rotation relative to a machine bed;

wherein the slider is composed of a carriage of a cylindrical shell having raceway grooves on an inside circular surface thereof in opposition to the raceway grooves on the spline shaft to define load-carrying races between the raceway grooves on the spline shaft and the raceway grooves on the carriage and further having return passages extending in parallel with the load-carrying races, end caps attached to lengthwise opposite ends of the carriage, the end caps having turnaround passages to connect the load-carrying races with the return passages, and the balls recirculating through a looped circuit made up of the load-carrying races, return passages and the turnaround passages;

wherein the carriage has a pair of first slots extending lengthwise of the carriage on the inside circular surface at circularly opposite locations in symmetry with each other and the end caps have paired second slots extending lengthwise of the end caps on inside circular surfaces thereof to communicate with the first slots; and wherein the holders each have a flanged portion adjacent to the end of the slider, a pair of projections extending integrally from an end surface of the flanged portion to fit into the first slots in the carriage across the second slots in one of the end caps, and a bearing mounting of a cylinder formed integral with the flanged portion to extend from another end surface opposite to the end surface of the flanged portion to fit snugly into an inner ring of one of the rolling-contact bearings.

In the present invention, a ball-spline with rotary mechanism is provided in which the projections on one of the holders each include a first portion to fit into the first slot and a second portion to fit into the second slot and a gap lying at a boundary between the first portion and the second portion to provide a stepwise edge which is envisaged coming into abutment against one of the lengthwise opposite ends of the carriage, locating in place the holder with respect to one of the lengthwise opposite ends of the slider to fasten the holder to the slider.

In the present invention, a ball-spline with rotary mechanism is provided in which a pair of the sliders fits over the spline shaft in lengthwise opposition to each other in a relation spaced at a preselected interval from each other, a cylindrical collar interposed between the sliders is fixed to inward ends of the sliders, the holders having the rolling-contact bearings fit over outward ends of the sliders, the cylindrical collar on lengthwise opposite ends thereof being formed with projections identical in construction with the projections of the holders, and the projections, after inserted into the first slots in the carriage, are clamped to the sliders.

In the present invention, a ball-spline with rotary mechanism is provided in which at least one of the holders has a cylindrical portion integral with the bearing mounting and having mounted thereon rotary driving part for sliding movement relative to the spline shaft.

In the present invention, a ball-spline with rotary mechanism is provided in which the projections of the holders have threaded holes at areas lying in opposition to threaded holes in the first slots inside the carriage, so that fastening screws, after having stretched through the threaded holes in the carriage, fit into the threaded holes in the projections to fasten the holders to the carriage.

In the present invention, a ball-spline with rotary mechanism is provided in which the first slots are formed with the help of unused areas there is none of the raceway grooves, the return passages and threaded holes used to fasten the carriage to the end caps.

In the present invention, a ball-spline with rotary mechanism is provided in which the end caps are each constituted with a spacer part attached to one of the end surfaces of the carriage and provided therein with inside curved halves of the turnaround passages, and an end-cap major body secured on an outward surface of the spacer part in adjacent to the flanged portion of the holder and provided therein with outside curved halves of the turnaround passages.

ADVANTAGEOUS EFFECTS OF THE INVENTION

In the ball-spline with rotary mechanism constructed as stated earlier according to the present invention, since the slider has the slots on the inside circular surface thereof and the holders to install the bearings at the opposite ends of the slider have the projections to fit into the slots, there is no need to mount any other additional component around the slider. Thus, the ball-spline with rotary mechanism, as being compact or slim in the overall outside dimension, can be downsized as small as possible and is adapted to perform high-precision works on a small scale. As only the complementary fit between the slots and the projections is sufficient to join the sliders and holders together, there is no need of high-precision works for complementary fit over wide mating surfaces and, therefore, the holders are easy for machining works. Moreover, the complementary fit between the slots inside the slider and the projections out of the holder is effective in weight reduction of the overall construction. With the alternative version of the ball-spline with rotary mechanism in which the collar is interposed between the sliders, as the collar may be made with a member less in the outside diameter and, therefore, easy for machining works. The alternative version is made as small as possible in size, able to perform high-precision works on a small scale and also weighs less than ever, helping the downsizing of the component-placement systems and, therefore, more adapted to the high-speed machines.

DETAILED DESCRIPTION OF THE PREFERRED EMBODIMENTS

Figure 1:
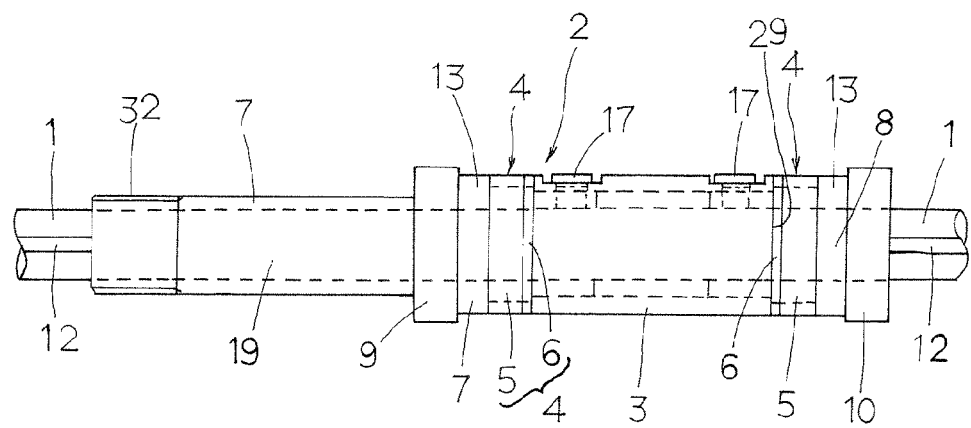
FIG. 1 is a view in front elevation showing a preferred embodiment of a ball-spline with rotary mechanism constructed according to the present invention.

Preferred embodiments of the ball-spline with rotary mechanism according to the present invention will be explained hereinafter in detail with reference to the accompanying drawings. The ball-spline with rotary mechanism of the present invention is suited for the component-placement head which is envisaged working in an upright or vertical posture in a diversity of manufacturing machines including semiconductor fabricating equipment, assembling machines and so on. More especially, the ball-spline with rotary mechanism of the present invention features an application of rolling-contact bearings to the conventional ball-spline working as the linear motion guide unit, and further an assembling construction between tubular holders 7, 8 and sliders 2, 2A, 2B to make it possible to install the rolling-contact bearings 9 10 at lengthwise opposite ends of the slider 2.

Referring first to FIGS. 1 to 4, there is shown a preferred embodiment of the ball-spline with rotary mechanism according to the present invention. With the ball-spline with rotary mechanism, the slider 2 is carried on a head frame or machine frame 36 of a component-placement head in, for example, a pick-and-place machine for rotation through the rolling-contact bearings 9, 10 and a spline shaft 1 fits into the slider 2 so as to travel up and down through a plurality of rolling elements or balls 45 in a sliding manner with respect to the carried slider 2. Thus, the spline shaft 1 is allowed to rotate while free to travel up and down simultaneously relative to the head frame or machine frame 36. After the ball-spline with rotary mechanism has been actuated, a nozzle head, not shown, at the tip of the spline shaft 1 pneumatically picks up a component or part from a feeder or tray, rotates the component to the correct orientation and then moves down towards a preselected location on, for example a printed circuit board with high precision.

The ball-spline with rotary mechanism is composed of the spline shaft 1 circular in transverse section having lengthwise raceway grooves or first raceway grooves 12 lying on a circular surface of the shaft 1 at locations diametrically opposite to each other, the slider 2 allowed to move up and down along the shaft 1 in a sliding manner by virtue of the rolling elements or balls 45, and the rolling-contact bearings 9, 10 installed with intervention of the tubular holders 7, 8 on lengthwise opposite ends of the slider 2. The slider 2 is provided on an inside circular surface thereof with lengthwise slots 21, 22 and 23 while the tubular holders 7, 8 to be intervened between the ends of the slider 2 and the rolling-contact bearings 9, 10 have projections 20 which are formed to snugly fit into the slots 21, 22 and 23. Mating engagement between the projections 20 and the slots 21, 22 and 23 complement each other contributes to the provision of the ball-spline with rotary mechanism compact in construction as a whole and less in weight.

The rotary mechanism combined with the ball-spline is constituted with the rolling-contact bearings 9, 10 installed at the lengthwise opposite ends of the slider 2 in the ball-spline in which the slider 2 fits over the spline shaft 1 to travel up and down the shaft 1 in a sliding manner. The ball-spline with rotary mechanism of the present invention is shrunk in overall dimension, for instance, an outside diameter of the spline shaft 1: 5 mm, an outside diameter of the slider 2: 9.9 mm, and the rolling-contact bearings 9, 10 are miniature ball bearings having the dimensions of an inside diameter: 7 mm, an outside diameter: 11 mm, and an axial length: 3 mm.

Figure 2:
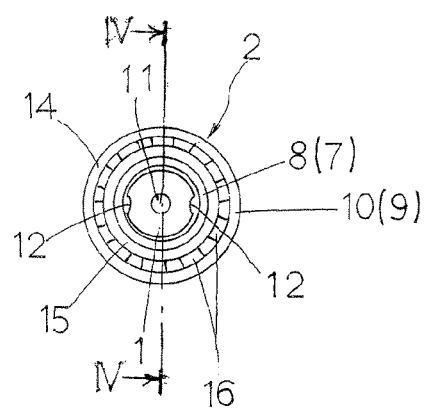
FIG. 2 is a view in end elevation of the ball-spline with rotary mechanism of FIG. 1.
Figure 3:
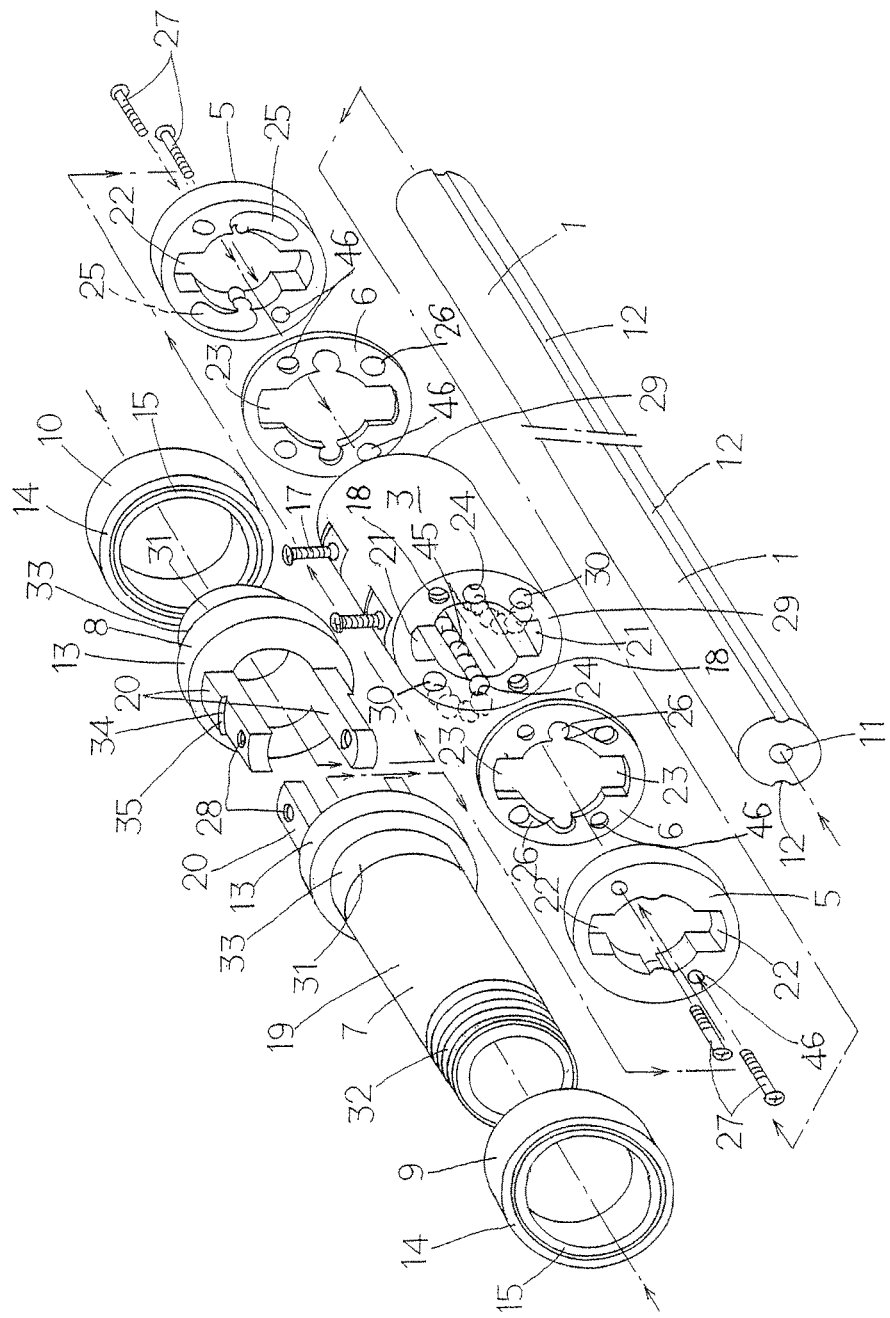
FIG. 3 is an exploded view in perspective to illustrate the ball-spline with rotary mechanism of FIG. 1.

The slider 2 as shown in FIGS. 1 to 3 is composed of a carriage 3 of a cylindrical shell that fits over the spline shaft 1 for sliding movement relative to the spline shaft 1, the carriage 3 having lengthwise raceway grooves or second raceway grooves 24 in opposition to the first raceway grooves 12 cut on the spline shaft 1, and end caps 4 attached to lengthwise opposite ends of the carriage 3, one to each end, the end caps 4 having spacer parts 6 lying on end surfaces 29 of the carriage 3 and end-cap major bodies 5 combined in close contact and in axial alignment with the spacer parts 6. On the lengthwise opposite ends of the slider 2, there are provided the rolling-contact bearings 9, 10 with intervention of the tubular holders 7, 8 in such a relation that the bearing 9, 10 are raised a little in a radial direction above the outside diameter of the slider 2. The rolling-contact bearings 9, 10 are composed of inner rings 15 mounted on shoulders 33 of the tubular holders 7, 8, outer rings 14 surrounding the inner rings 15 for rotation relative to each other and kept in place inside the machine frame, and the rolling elements 16 interposed between the outer ring 15 and the inner ring 14. With the embodiment discussed here, the outer rings 14 of the rolling-contact bearings 9, 10 each have a radial dimension raised slightly above the outside diameter of the slider 2, and the tubular holders 7, 8 are secured to the slider 2. The tubular holders 7, 8 have inside circular surfaces which are isolated away from the spline shaft 1 so as not to touch the spline shaft 1 as in the inside circular surface of the slider 2. The tubular holders 7, 8 each have a flanged portion 13 identical in an outside diameter with the slider 2, a bearing mounting 31 adjacent to the flanged portion 13, and a collar extending towards the slider 2 from an end opposite to the flanged portion 13.

The ball-spline with rotary mechanism constructed according to the first embodiment as stated earlier is envisaged having been employed in the pick-and-placement head. The tubular holder 7 laid on one side, left in FIG. 1, of the slider 2 has a cylindrical portion 19 which is to have a gear wheel thereon and terminates to external threads 32. Thus, the cylindrical portion 19 has mounted thereon driving parts to transmit the rotary power of a motor, not shown, to the spline shaft 1 through the tubular holder 7. Another tubular holder 8 laid on the other side of the slider 2 has only an axial length sufficient to fit just into the rolling-contact bearing 10. With the embodiment constructed as stated earlier, the tubular holders 7, 8 installed on opposite sides of the slider 2 have the respective rolling-contact bearings 9, 10. The slider 2 employed here is of long type having more load-carrying capacity than in the standard product. The slider 2, as having the carriage 3 longer than in the standard product, makes the raceway grooves 24 in the slider 2 longer than ever and correspondingly making it possible to increase the number of the rolling elements 45 so as to carry heavier load. Thus, it is to be understood that the ball-spline with rotary mechanism of the first embodiment is made more compact in lengthwise direction, as compared with a ball-spline with rotary mechanism having a pair of sliders 2A, 2B as will be stated later.

Moreover, the tubular holders 7, 8 as shown in an exploded perspective view of FIG. 3 each have a pair of the projections 20 extending integrally from an end surface of the flanged portion 13 into the interior of the slider 2. The projections 20 each have a length which falls short of a half the overall axial length of the carriage 3 so as not to come into hitting against the projections 20 of the counter tubular holder 8. The paired projections 20 on one of the tubular holders 7, 8 have inside circular surfaces lying in diametrically opposite relation with each other and extending in coplanar with the inside circular surface of the flanged portion 13. The projections 20 each have a rectangular configuration in transverse section and have an outside circular surface which includes a first distal outside circular surface put deep into the carriage 3 and a second proximal outside circular surface lying between the first distal outside circular surface and the outward end of the flanged portion 13 to be set inside the end cap 4 of the slider 2. The second proximal outside circular surface is raised radially above the first distal outside circular surface to provide a radial gap 34 at a boundary between the first outside surface and the second outside surface. The radial gap 34 forms a stepwise edge 35 lying in perpendicular to the axial direction of the tubular holders 7, 8 so as to come into abutment against the relevant end surface 29 of the carriage 3 after the projections 20 have fitted deeply into the lengthwise slots 21, 22 and 23. That is, the outside circular surfaces of the projections 20 of the tubular holders 7, 8 have the radial gaps 34 serving as the stepwise edges 35 which come into abutment against the end surfaces 29 of the carriage 3.

With the tubular holders 7 and 8 constructed as stated earlier, the outside circular surfaces on the first distal portions of the projections 20 have threaded holes 28 which are used to firmly connect the holders 7, 8 to the carriage 3 through fastening screws 17 tightened from the outside of the carriage 3. On an end surface of the flanged portion 13 axially opposite to the projections 20, there is provided the bearing mounting 31 on which any one of the rolling-contact bearings 9, 10 is mounted. The bearing mountings 31 are each defined with the end surface of the flange portion 13 lying perpendicular to the axial direction of the tubular holder 7 or 8, and the shoulder 33 reduced radially relative to the flanged portion 13 and extended axially from the end surface to fit into the inner ring of the rolling-contact bearing 9 or 10. On the outside circular surfaces of the projections 20 of the tubular holders 7 and 8, the gaps 34 are provided at the middle lengthwise of the projections 20. The gaps 34 each have the stepwise edge 35 lying so as to come into abutment against the end surface 29 of the carriage 3, making certain of accurate location of the relevant tubular holder 7 or 8. The provision of the stepwise edges 35 envisaged coming into abutment or engagement with the end surfaces 29 of the carriage 3 makes it possible to fasten securely the tubular holders 7, 8 to the end surfaces of the slider 2 at the preselected locations where there remain small clearances to keep the flanged portions 13 of the tubular holders 7, 8 from engaging with or coming collision against the end surfaces of the end caps 4 of the slider 2.

Figure 4:
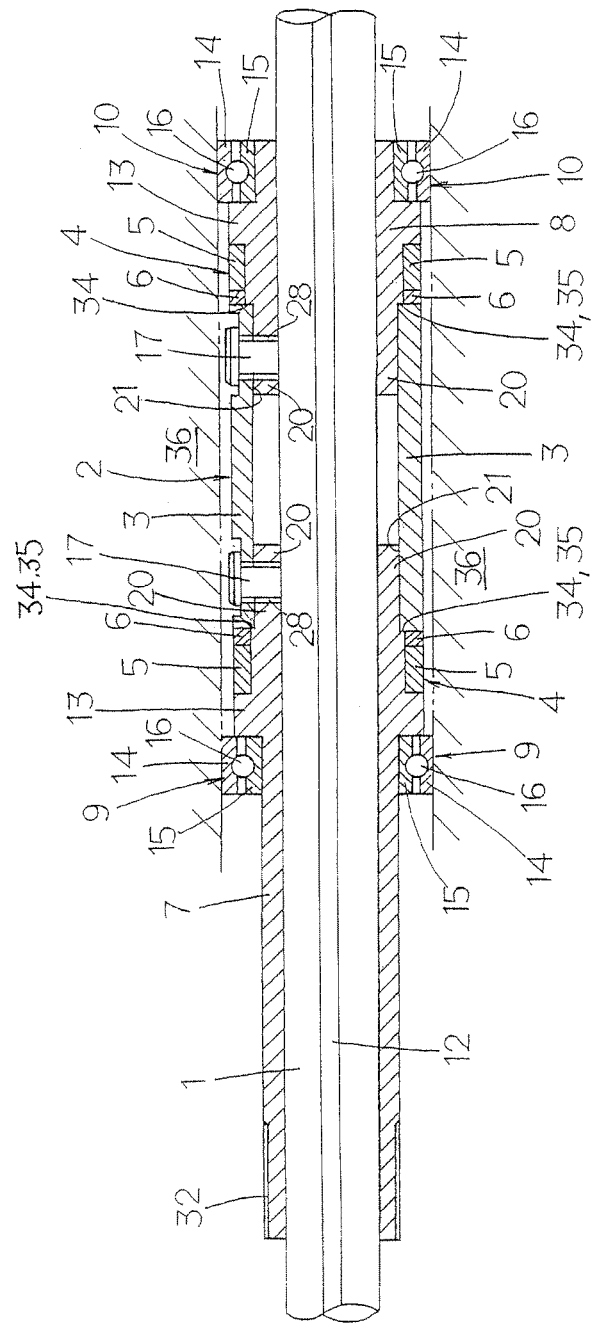
FIG. 4 is a view in longitudinal section taken on the plane of the line IV-IV of FIG. 2.

The shoulders 33 of the tubular holders 7, 8 each have an outside diameter identical with an inside diameter of the inner ring 15 of the rolling-contact bearing 9 or 10 while having an inside circular surface coplanar with the inside circular surface of the flanged portion 13 to form a cylinder extending integrally from the end surface of the flanged portion 13 in an axial direction of the flanged portion 13. The tubular holder 7 has the cylindrical portion 19 which is further elongated from the cylinder of the flanged portion 13 in the axial direction. The cylindrical portion 19 is to carry a gear wheel thereon and terminates to the external threads 32. Namely, the tubular holder 7 has the cylindrical portion 19 which is integral with the shoulder 33 and has the male threads 32 at the end thereof. Further the cylindrical portion 19 fits over the spline shaft 1 for free sliding movement relative to the spline shaft 1 and is equipped thereon with the rotary parts. Another tubular holder 8 has the shoulder 33 which is substantially equal in axial length or width to the axial width of the rolling-contact bearing 10. The shoulders 33 as shown in FIG. 4 each have an outside diameter which is determined to keep such a relation that the outside circular surface or the outside diameter of the outer ring of the rolling-contact bearing 9 or 10 mounted on the shoulder 33 is slightly raised above the outside circular surface or the outside diameter of the slider 2. With the relation between the outside circular surfaces of the slider 2 and the bearings 9, 10 as stated just earlier, the slider 2 is protected from a possibility of interfering around the outside circular surface thereof with the machine frame 36 such as the component-placement heads and so on whenever the slider 2 is rotated. The end surfaces of the flanged portions 13 confronting to the bearings 9, 10 as shown in FIG. 4 are at right angles relative to the lengthwise direction of the slider 2 so as to come into close engagement with end surfaces of the inner rings 15 of the bearing 9, 10 which have fitted over the bearing mountings 31 or shoulders 33, thereby keeping in place the bearings 9, 10. The end surfaces of the flanged portions 13 are cut relieved around a circular edge thereof so as not to touch end surfaces of the outer rings 14 of the bearings 9, 10, thereby allowing the outer rings 14 of the bearings 9, 10 to rotate freely.

On the inside circular surface of the slider 2, as shown in FIG. 3, there are provided the lengthwise slots 21, 22 and 23 to accommodate the projections 20 of the tubular holders 7, 8. The slider 2 is composed of the carriage 3 of the cylindrical shell in which the spline shaft 1 fits for sliding movement, the carriage 3 having the second raceway grooves 24 cut in the inside circular surface thereof in opposition to the first raceway grooves 12 on the spline shaft 1, the carriage 3 further having return passages 30 extending in parallel with the load-carrying raceways defined between the first and second raceway grooves 12 and 24, the spacer parts 6 attached to the end surfaces of the carriage 3, one to each end surface, and provided therein with inside curved halves 26 of the turnaround passages to connect the load-carrying races and their associated return passages 30, and the end-cap major bodies 5 secured on the outward surfaces of the spacer parts 6 and provided therein with outside curved halves 25 of the turnaround passages. The end caps 4 are each constituted with a combination of the end-cap major body 5 and the spacer part 6. The slider 2 of the present invention is more compact or slim in construction than ever because of having no end seals as opposed to the conventional sliders.

The slots 21, 22 and 23 in the slider 2 are designed to snugly fit over the projections 20 of the tubular holders 7, 8 and placed in diametrical opposition (180 degrees) on the inside circular surface to extend at right angles or 90 degrees relative to the raceway grooves 24. With the carriage 3, especially, the slots 21 or the first slots are made with the help of unused areas there is none of the raceway grooves 24, the return passages 30 and threaded holes 18. With the end-cap major bodies 3, further, the slots 22 or the second slots are cut with the help of unused areas there is none of threaded or cored holes 46 and the raceway grooves 24 and the outside curved halves 25 of the turnaround passages. The spacer parts 6 has the slots 23 or the third slots which are made with the help of unused areas there is none of threaded or cored holes 46 and the inside curved halves 26 of the turnaround passages. The slots 21 in the carriage 3 have bottoms lying at an inside diameter in which the first outside circular surfaces of the projections 2C are allowed to come into mating with the bottoms after the projections 20 have fitted deeply into the slots 21. The slots 22, 23 in the end-cap major bodies 5 and the spacer parts 6 for the end caps 4 have bottoms lying at a common inside diameter in which the second outside circular surfaces of the projections 20 are allowed to come into mating with the bottoms. Moreover, the slots 22, 23 in the end-cap major bodies 5 and the spacer parts 6 for the end caps 4 are cut deeper than the slots 21 in the carriage 3 by as much as the radial gaps 34 on the projections 20. All the slots 21 in the carriage 3, slots 22 in the end-cap major bodies 5 and the slots 23 in the spacer parts 6 are in alignment with each other to allow the projections 20 of the tubular holders 7, 8 to extend through the slots 21, 22 and 23.

On the outside circular surface of the carriage 3, a pair of bolt holes is bored in opposition to the slots 21. Fastening screws 17, after having stretched through the holes, fit into threaded holes 28 in the projections 20 to fasten the tubular holders 7, 8 to the slider 2. The spline shaft 1 of elongated cylinder has the raceway grooves 12 lying diametrically opposed to each other on a circular surface of the cylinder to extend lengthwise of the cylinder, and an axial through-hole 11 to communicate a pneumatic suction source to a nozzle head, not shown, which is mounted on the tip of the spline shaft 1 to pick up and then place components.

The ball-spline with rotary mechanism of the present invention is constructed as follows with the components as stated earlier.

First, the end caps 4 each composed of the end-cap major body 5 and the spacer part 6 are secured to the end surfaces 29 of the carriage 3, one to each end surface, with the fastening screws 27 and at the same time the rolling elements of balls 45 are charged into the looped or closed circuits to complete the assembly of the slider 2. Especially, the carriage 3 on the end surfaces 29 thereof has a pair of the threaded holes 18, and the end-cap major bodies 5 and the spacer parts 6 to form the end caps 4 each have a pair of the cored holes 46 lying in opposition to the threaded holes 18 on the carriage 3. Then, after keeping all the carriage 3, spacer parts 6 and the end-cap major bodies 5 so as to bring their threaded holes 18 and cored holes 46 into line, the screws 27 stretch through the cored holes 46 when tightened and fit into the threaded holes 18 to clamp the spacer parts 6 and end-cap major bodies 5 together with the carriage 3 into the completed slider 2.

In second phase, the projections 20 of the tubular holders 7, 8 are inserted into the slots 22, 23 and 21 from both the end surfaces of the slider 2 to a depth the stepwise edges 35 at the radial gaps 34 on the projections 20 come into abutment against the end surfaces 29 of the carriage 3. Then, the fastening bolts 17 are tightened from the outside of the carriage 3 to fit into the threaded holes 28 in the projections 20 to complete the slider 2 having the tubular holders 7, 8 on the end surfaces thereof. For more firmly securing together the components stated earlier, moreover, any adhesives may be applied to mating surfaces of the carriage 3 with the projections 20 of the tubular holders 7, 8.

In third phase, the spline shaft 1 fits into the slider 2 together with tubular holders. Then, the shoulder 31 or bearing mountings 33 are machined on the tubular holders 7, 8 in accurate concentricity with the spline shaft 1.

In fourth phase, the rolling-contact bearings 9, 10 are held securely in place on the shoulder 31 or bearing mountings 31 whereby the ball-spline with rotary mechanism is wrought.

Figure 5:
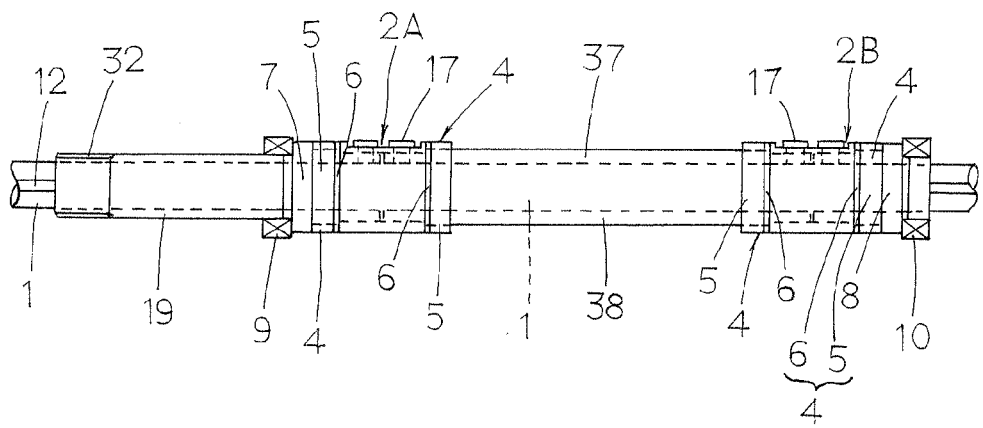
FIG. 5 is a view in front elevation showing a second version of the ball-spline with rotary mechanism according to the present invention.
Figure 6:
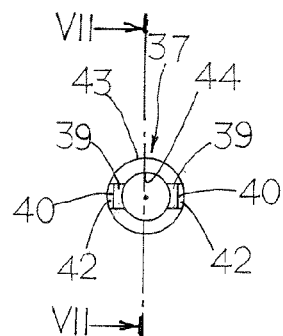
FIG. 6 is a view in end elevation showing a collar in FIG. 5.
Figure 7:
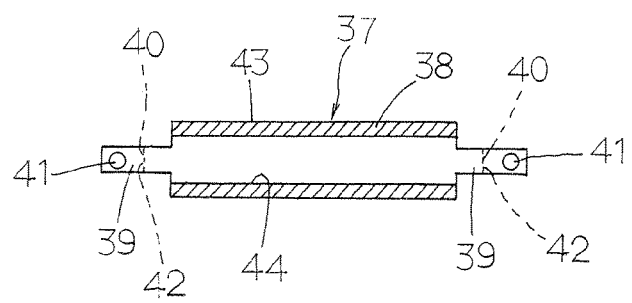
FIG. 7 is a view in longitudinal section of the collar of FIG. 5, taken on the plane of the line VII-VII of FIG. 6.
Figure 8:
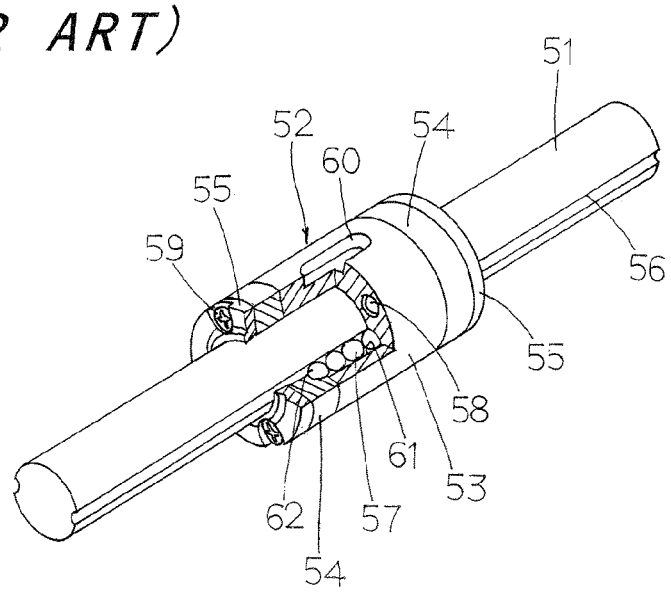
FIG. 8 is a view in perspective, partially broken away, showing a conventional ball-spline.

Referring now to FIGS. 5 to 7, there is shown a second version of the ball-spline with rotary mechanism according to the present invention. With the ball-spline with rotary mechanism of the second version, sliders 2A and 2B are spaced away from each other at a preselected interval on the spline shaft 1. This version is preferable to an application in which the tip of the spline shaft 1 is subject to large momentum of force.

With the ball-spline with rotary mechanism of the second version in which the sliders 2A, 2B are opposed to each other on the spline shaft 1 in a way spaced at a preselected interval from each other, a cylindrical collar 37 interposed between the sliders 2A, 2B is fixed to inward ends of the sliders 2A, 2B. The tubular holders 7, 8 having the rolling-contact bearings 9, 10 fit over outward ends of the sliders 2A, 2B on the opposite side of the inward ends fastened to the cylindrical collar 37. On lengthwise opposite ends of the cylindrical collar 37, there are formed projections 39 like the projections 20 of the tubular holders 7, 8. The projections 39, after inserted into the slots 21, 22 and 23 in the sliders 2A and 2B, are clamped to the sliders 2A, 2B by means of the fastening screws 17 which stretch through the holes in the carriage 3 and fit into threaded holes 41 in the projections 39 to fasten the tubular holders 7, 8 to the slider 2.

As seen in FIG. 5, the ball-spline with rotary mechanism according to the second version is composed of the sliders 2A, 2B opposed to each other on the elongated spline shaft 1 while spaced at a preselected interval from each other, the cylindrical collar 37 interposed between the sliders 2A, 2B and secured to inward ends of the sliders 2A, 2B, the tubular holder 7 having the rolling-contact bearing 9 which fits over the outward end of the slider 2A on the opposite side of the inward end fastened to the cylindrical collar 37, and the tubular holder 8 having the rolling-contact bearing 10 which fits over the outward end of the slider 2B on the opposite side of the inward end fastened to the cylindrical collar 37. The tubular holders 7 and 8 have the same construction as in the first version stated earlier. The sliders 2A and 2*b* have the same dimension as in the standard product and the carriage 3 has the same length as in the standard product. Thus, the sliders 2A and 2B are less in length as compared with the slider 2 in the first version. The slots 21, 22 and 23 in the sliders 2A and 2B, namely, the slots 21 or the first slots in the carriages 3 and the slots 22, 23 in the spacer parts 6 and the end-cap major bodies 5 for the end caps 4 are constructed as with the slots in the first version.

The second version features the distinctive construction of the collar 37. As shown in FIGS. 6 and 7, the collar 37 includes a cylindrical major portion 38 of a preselected length extending between the inward ends of the sliders 2A and 2B opposing to each other, and a pair of projections 39 extending integrally out of lengthwise opposite ends of the cylindrical major portion 38. An inside circumferential surface 44 of the cylindrical major portion 38 merges with the inside circumferential surfaces 44 of the projections 39 into a common coplanar inside circular surface 44 which extends without coming into touching the spline shaft 1 throughout as in the inside circular surfaces of the tubular holders 7, 8. The projections 39 of the collar 37 have the same construction as in the projections 20 of the tubular holders 7, 8 in the first version. The projections 39 have the inside circumferential surfaces extending in coplanar with the inside circumferential surface of the cylindrical major portion 38. Moreover, the projections 39 are placed in diametrical symmetry with each other or at 180 degrees away from each other. The projections 39 each have a rectangular configuration in transverse section perpendicular to the axial direction and have an outside circular surface sunken radially below an outside circular surface around the cylindrical major portion 38. The projections 39 each include a first distal portion to fit deep into the slot 21 in the carriage 3 and a second proximal portion lying between the distal portion and the outward end of the cylindrical major portion 38 to fit into the slots 22, 23 inside the and cap 4 of the slider 2A or 2B. A second outside circular surface on the second proximal portion is raised radially above a first outside circular surface on the first distal portion to provide a radial gap 40 at a boundary between the first outside circular surface and the second outside circular surface. The radial gap 40 forms a stepwise edge 42 lying in perpendicular to the axial direction of the collar 37 so as to come into abutment against the relevant end surface 29 of the carriage 3 after the projections 39 have fitted deeply into the lengthwise slots 21, 22 and 23.

Namely, the outside circular surfaces of the projections 39 have the radial gaps 40 serving as the stepwise edges 42 which are envisaged coming into abutment against the end surfaces 29 of the carriage 3. The stepwise edges 42 at the radial gaps 40 on the outside surfaces of the projections 39, when the projections 39 have been introduced or inserted into the sliders 2A and 2B, come into abutment or engagement with the end surface 29 of the carriage 3, making certain of accurate location of the collar 37 at the preselected location where the collar 37 is fastened to the ends of the sliders 2A, 2B with remaining small clearances to keep the lengthwise ends of the cylindrical major portion 38 of the collar 37 away from engaging with or coming collision against the end surfaces of the end caps 4 of the sliders 2A and 2B. On the outside circular surfaces on the first distal portions of the projections 39 of the collar 37, there are provided threaded holes 41 which are used to firmly connect the collar 37 to the sliders 2A, 2B through fastening screws 17 tightened from the outside of the carriage 3. The outside circular surface around the cylindrical portion 38 of the collar 37 is made flush with the outside circular surfaces around the second proximal portions of the projections 39. Thus, the projections 39 each have the outside circular surface sunken radially below the outside circular surface around the cylindrical major portion 38 of the collar 37.

The ball-spline with rotary mechanism of the second version is constructed as follows.

First, the projections 39 of the collar 37 lying between the inward end surfaces of the sliders 2A, 2B are inserted into the slots 22, 23 and 21 of the sliders 2A, 2B to a depth the stepwise edges 42 at the radial gaps 40 on the projections 39 come into abutment against the end surfaces 29 of the carriage 3. Then, the fastening bolts 17 are tightened from the outside of the carriage 3 to fit into the threaded holes 41 in the projections 39 to complete a tandem slider combined with the collar 37. For more firmly securing together the components stated earlier, moreover, any adhesives may be applied to mating surfaces of the carriage 3 with the projections 39 of the collar 37.

In second phase, the projections 20 of the tubular holder 7 are introduced into the slots 22, 23 and 21 from an outward end surface of the slider 2A to a depth the stepwise edges 35 at the radial gaps 34 on the projections 20 come into abutment against the end surfaces 29 of the carriage 3. Then, the fastening bolts 17 are tightened from the outside of the carriage 3 to fit into the threaded holes 28 in the projections 20 to secure the holder 7 to the end surface of the slider 2A. The projections 20 of another tubular holder 8 are inserted into the slots 22, 23 and 21 from an outward end surface of the slider 2B to a depth the stepwise edges 35 at the radial gaps 34 on the projections 20 come into abutment against the end surfaces 29 of the carriage 3. Then, the fastening belts 17 are tightened from the outside of the carriage 3 to fit into the threaded holes 28 in the projections 20 to secure the holder 8 to the end surface of the slider 2B to thereby complete the combined sliders 2A, 2B together with the tubular holders. For more firmly joining together the sliders 2A, 2B and the tubular holders 7, 8, moreover, any adhesives may be applied to mating surfaces of the slots 21 and the projections 21.

In third phase, the spline shaft 1 fits into the sliders 2A, 2B with the tubular holders. Then, the bearing mountings 31 are machined on the tubular holders 7, 8 in accurate concentricity with the spline shaft 1 to provide a ball-spline with the holders having the concentric bearing mountings 31 thereon.

In fourth phase, the rolling-contact bearings 9, 10 are held securely in place on the bearing mountings 31 whereby the ball-spline with rotary mechanism is wrought according to the second version.

What is claimed is:

1. A ball-spline with rotary mechanism, comprising; an elongated spline shaft circular in transverse section having raceway grooves extending lengthwise of the spline shaft on a circular surface of the shaft at locations angularly opposite to each other, a slider fitting over or conforming to the spline shaft to move up and down along the spline shaft in a sliding manner by virtue of rolling elements of balls, holders lying on lengthwise opposite ends of the slider, and rolling-contact bearings installed to keep the holders for rotation relative to a machine bed;

wherein the slider is composed of a carriage of a cylindrical shell having raceway grooves on an inside circular surface thereof in opposition to the raceway grooves on the spline shaft to define load-carrying races between the raceway grooves on the spline shaft and the raceway grooves on the carriage and further having return passages extending in parallel with the load-carrying races, end caps attached to lengthwise opposite ends of the carriage, the end caps having turnaround passages to connect the load-carrying races with the return passages, and the balls recirculating through a looped circuit made up of the load-carrying races, return passages and the turnaround passages;

wherein the carriage has a pair of first slots extending lengthwise of the carriage on the inside circular surface at circularly opposite locations in symmetry with each other and the end caps have paired second slots extending lengthwise of the end caps on inside circular surfaces thereof to communicate with the first slots; and wherein the holders each have a flanged portion adjacent to the end of the slider, a pair of projections extending integrally from an end surface of the flanged portion to fit into the first slots in the carriage across the second slots in one of the end caps, and a bearing mounting of a cylinder formed integral with the flanged portion to extend from another end surface opposite to the end surface of the flanged portion to fit snugly into an inner ring of one of the rolling-contact bearings.

2. A ball-spline with rotary mechanism as set forth in claim 1, wherein the projections on one of the holders each include a first portion to fit into the first slot and a second portion to fit into the second slot and a gap lying at a boundary between the first portion and the second portion to provide a stepwise edge which is envisaged coming into abutment against one of the lengthwise opposite ends of the carriage, locating in place the holder with respect to one of the lengthwise opposite ends of the slider to fasten the holder to the slider.

3. A ball-spline with rotary mechanism as set forth in claim 1, wherein a pair of the sliders fits over the spline shaft in lengthwise opposition to each other in a relation spaced at a preselected interval from each other, a cylindrical collar interposed between the sliders is fixed to inward ends of the sliders, the holders having the rolling-contact bearings fit over outward ends of the sliders, the cylindrical collar on lengthwise opposite ends thereof being formed with projections identical in construction with the projections of the holders, and the projections, after inserted into the first slots in the carriage, are clamped to the sliders.

4. A ball-spline with rotary mechanism as set forth in claim 1, wherein at least one of the holders has a cylindrical portion integral with the bearing mounting and having mounted thereon rotary driving part for sliding movement relative to the spline shaft.

5. A ball-spline with rotary mechanism as set forth in claim 1, wherein the projections of the holders have threaded holes at areas lying in opposition to threaded holes in the first slots inside the carriage, so that fastening screws, after having stretched through the threaded holes in the carriage, fit into the threaded holes in the projections to fasten the holders to the carriage.

6. A ball-spline with rotary mechanism as set forth in claim 1, wherein the first slots are formed with the help of unused areas there is none of the raceway grooves, the return passages and threaded holes used to fasten the carriage to the end caps.

7. A ball-spline with rotary mechanism as set forth in claim 1, wherein the end caps are each constituted with a spacer part attached to one of the end surfaces of the carriage and provided therein with inside curved halves of the turnaround passages, and an end-cap major body secured on an outward surface of the spacer part in adjacent to the flanged portion of the holder and provided therein with outside curved halves of the turnaround passages.

* * * * *